C. R. PRATT.
SPEED CONTROL.
APPLICATION FILED SEPT. 7, 1910.
1,049,000.
Patented Dec. 31, 1912.
2 SHEETS—SHEET 1.
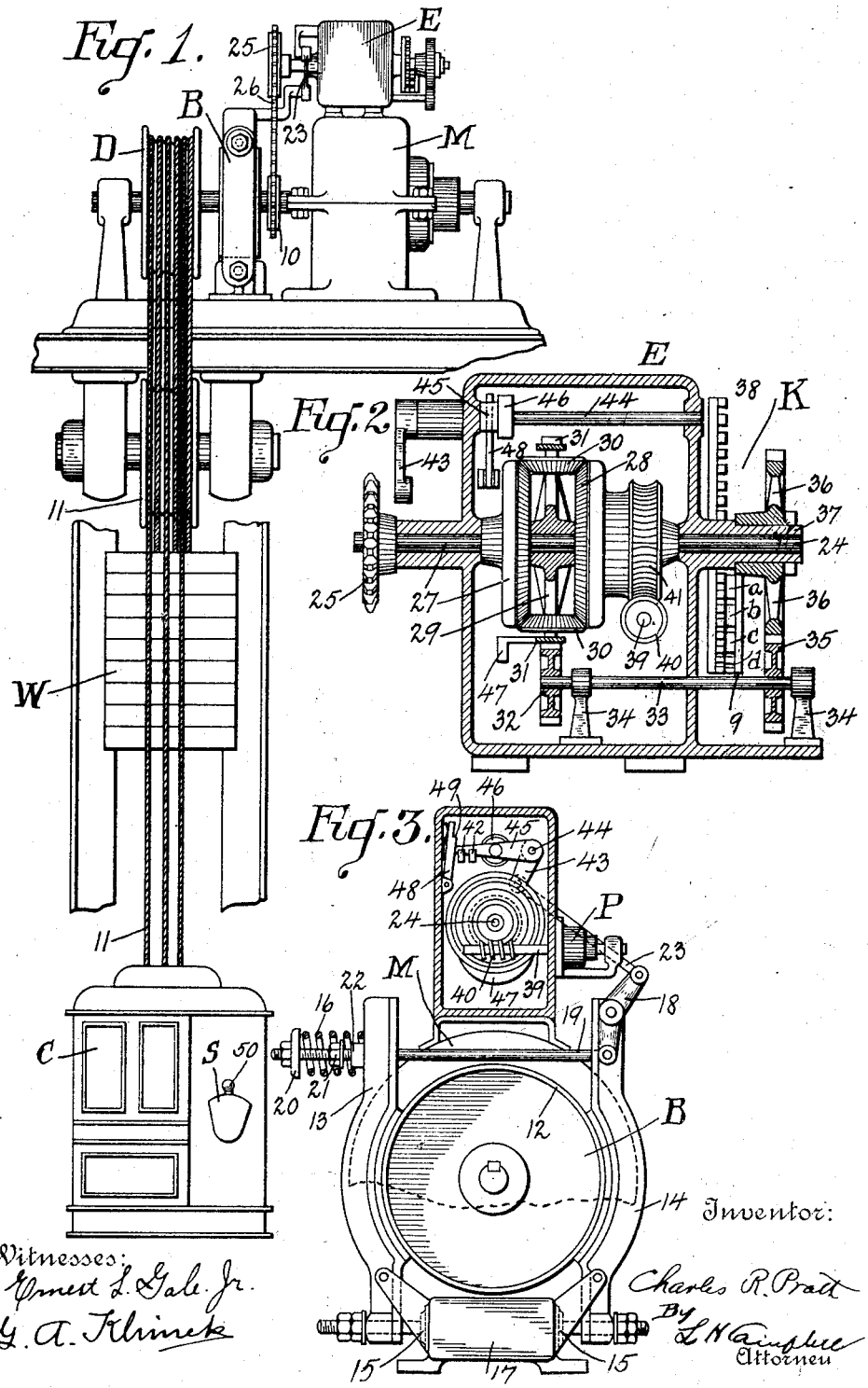

C. R. PRATT.
SPEED CONTROL.
APPLICATION FILED SEPT. 7, 1910.

1,049,000.

Patented Dec. 31, 1912.
2 SHEETS—SHEET 2.

Fig. 4.

Witnesses:
Ernest J. Gale Jr.
G. A. Klinck

Inventor:
Charles R. Pratt
L. H. Campbell
Attorney

UNITED STATES PATENT OFFICE.

CHARLES R. PRATT, OF MONTCLAIR, NEW JERSEY, ASSIGNOR TO OTIS ELEVATOR COMPANY, OF JERSEY CITY, NEW JERSEY, A CORPORATION OF NEW JERSEY.

SPEED CONTROL.

1,049,000. Specification of Letters Patent. Patented Dec. 31, 1912.

Application filed September 7, 1910. Serial No. 580,807.

*To all whom it may concern:*

Be it known that I, CHARLES R. PRATT, a citizen of the United States, residing at Montclair, in the county of Essex and State of New Jersey, have invented a new and useful Improvement in Speed Control, of which the following is a specification.

My invention relates to controlling mechanism for motors, with particular application to elevator apparatus.

Objects of the invention are to provide means for automatically regulating and maintaining uniform speed of a motor regardless of load; for operating motors in synchronism and to effect a return to synchronism when the relative speed of the motors varies; for securing any desired speed of the driving motor; for effecting a speedy return of the controlling mechanism to stop position; for closing a local or dynamic circuit through the driving motor in stopping; for preventing the closure of one reversing switch when the other is closed; for automatically varying the field of an auxiliary or pilot motor when the load on the driving motor is too great to enable the latter to attain the same speed as for a lighter load; and to protect the electrical apparatus and devices from the injurious results incident thereto.

Other objects will appear hereinafter.

The mechanism herein disclosed involves various mechanical and electrical features embodied in my co-pending application for patent on "controlling mechanism for motors", Serial No. 447,359, filed August 7, 1908.

Referring to the accompanying drawings, Figure 1 is an elevation view, partly diagrammatic, showing an elevator system to which my invention is applied; Fig. 2 is a sectional elevation of the planetary gearing located between the main and pilot motors, and the main motor controller adapted to be operated by said gearing; Fig. 3 is a view showing the main motor brake and the brake operating mechanism; Fig. 4 is a diagrammatic view of the electrical circuits and controlling mechanism to be used in connection with the elevator apparatus shown in Figs. 1 to 3.

My invention contemplates the regulation and control of prime movers.

In general, it comprises a main motor, and an auxiliary or pilot motor, with gearing between the motors, and an automatic controller or speed regulator operated by the said gearing.

A practical application of the invention is illustrated by the drawings.

In Fig. 1 is shown a well known arrangement of an elevator car C, counterweight W, driving motor M, brake B, driving sheave D, and cables 11. The gearing and automatic control devices are preferably located on top of the motor M. Between the motor M and the driving pulley D, the brake B is located, the latter comprising a brake pulley 12 (Fig. 3) mounted upon the motor shaft, brake levers 13, 14 secured to the magnet cores 15 and adapted to be applied to the brake pulley 12 by the spring 16 when the magnet cores are not attracted by the magnet 17. The brake applying spring 16 is mounted upon the rod 19 which extends through the brake levers 13 and 14, and the rod is provided at its free end with the adjustable head 20 for the spring, the nut 21 and the buffer 22. A lever 18 is mounted on the brake lever 14 and one arm is connected to the end of the rod 19. To the other arm of the lever 18 a link 23 is connected. The operation of this lever 18 will be hereafter set forth.

Referring now to Fig. 2, the casing E contains the gearing forming a connection between the main motor M and the pilot motor P. Journaled in bearings in the frame E is a shaft 24, to one end of which is secured a sprocket wheel 25 connected by a sprocket chain to a sprocket wheel 10 secured to the shaft of the motor M. Keyed to the shaft 24 is a bevel gear wheel 27 opposite a similar gear wheel 28 loosely mounted on the shaft 24. Between the opposing faces of the gears 27 and 28 is a wheel or spider 29 loose on the shaft 24 and carrying bevel pinions 30 journaled on the radial arms of the spider and each meshing with the gears 27 and 28. The spider 29 also carries an annular spur gear wheel 31 located outside of the pinions 30 and meshing with a gear wheel 32 secured to a shaft 33 journaled in bearings 34. A pinion 35, fixed to the shaft 33, meshes with a gear wheel 36 journaled on a sleeve 37 which also forms a bearing for the shaft 24. The gear wheel 36 carries a switch arm 9 provided with electrical contacts $a$, $b$, $c$, $d$, each in sliding engagement with and bridging two arc-shaped contacts on the stationary disk 38 of the automatic controller K. The shaft 39 of the pilot motor P is provided with a worm 40 which meshes with a worm wheel 41 secured to or formed integral with the gear wheel 28.

The lever 18 on the upper end of the brake lever 14 is connected by a link 23 to a crank arm 43 on a rock shaft 44 journaled in the upper part of the casing E. A switch arm 45 secured to the shaft 44 carries a roller 46 located in the path of movement of a cam 47 secured to or formed integral with the gear ring 31. The switch arm normally engages switch contacts 42. A spring pressed catch 48 formed with a shoulder 49 bears against the switch arm 45, the shoulder being adapted to engage beneath and prevent the return of the switch arm after the arm has been lifted by the cam 47.

The operation of the mechanism above described will be understood from the following explanation: Assuming the parts to be at rest and it is desired to start the car, the switch lever 50 of the car switch S is moved either to the right or to the left, depending on the direction in which it is desired to move the car. This effects a supply of current to the pilot motor P through circuits presently to be described, so that the said motor is started and runs at a speed depending upon the extent of movement of the switch lever 50. Current is also supplied to the brake magnet 17 to release the brake levers, and to the main motor M to start and run it at low speed. The pilot motor P operates through the worm and worm wheel to rotate the gear wheel 28 in one direction, and the main motor operates through the sprocket chain and gears to rotate the gear wheel 27 in the opposite direction. The rotation of the gear wheels 27 and 28 rotates the pinions 30 about their axis, and as the gear wheel 28, operated by the pilot motor P, rotates faster than the gear wheel 27, the spider 29, is rotated on the shaft 24. This operates through the gears 31, 32, 35 and 36 to rotate the switch arm 9 and move the contacts $a$, $b$, $c$, $d$, over the stationary contacts of the controller K. The movement of the arm 9 causes an increase in the speed of the motor M by effecting a weakening of the motor field and a decrease in the resistance in the armature circuit. This increase in speed is in proportion to or varies with the extent of movement of the arm 9, and the motor M continues to accelerate until the gear 27 is running at the same speed as the gear 28, and in this event the arm 9 comes to rest in position to maintain the motor at the said speed. Any variation in speed of the main motor M due to an increase or decrease in the load, or other causes, will cause the arm 9 to move in a direction to bring the motor back to the same speed. If the car switch lever is moved so as to impart a different speed to the pilot motor, the speed of the main motor will be correspondingly changed, the differential gearing always moving the controller arm 9 into position to bring the motors into synchronism.

In Fig. 4, the electrical circuits and controlling mechanism forming a part of my invention are shown as applied to an elevator system. This mechanism comprises a manual car switch S, an automatic controller K, reversing switches R, R', for the armature circuits of the main motor, starting resistance for the main motor, relay magnets N, O, J, to control the starting resistances, brake magnet coil 51 and shunt field winding 53 for the main motor, brake magnet coil $54^a$ and shunt field winding 52 for the pilot motor, magnets Y and Z to control the circuits of the pilot motor reversing switches, and various other controlling magnets, the operation of which will be subsequently set forth. The manual car switch S comprises the lever 50 carrying insulated contacts 54, 55, each adapted to bridge stationary contacts when the lever is moved to the right or left from the central position. The arm 9 of the controller K carries four insulated contacts, $a$, $b$, $c$, and $d$, each adapted to bridge various sets of contacts as the arm 9 is moved.

Current is supplied from the positive and negative mains, designated by + and −, respectively. In Fig. 4 the controlling apparatus is shown with the various parts in their normal position of rest. The circuit for the magnet N extends from the + main through the wire 101, contact bar 88 of magnet Q, controller contact $c$, wire 102, magnet N, and − wire 74 to the − main. The magnet N being energized short-circuits the armature resistance, comprising the sections 67, 67', 68 and 69. A local or dynamic circuit across the motor armature may be traced from the brush 55', through contact bars 58, 62, 57, of the reversing switches R and R', thence through the conductor 103, lower contacts of magnet N, conductor 104, contact bars 61, 66, 63, and to the brush 56. The field coil 52 of the pilot motor receives current at all times through a circuit which may be traced from the + main, through conductor 70, contacts 72, 54, 71, of switch S, through field winding 52 and wire 74 to the − main. If now, it is desired to start the car in an upward direction, the car switch S is moved to the right so that the brush 55' approaches the stationary contact bars 105 and 106. The circuit is thus completed through the magnet Z by way of the + wire 70, contacts 106, 55, 105, magnet Z and — wire 74. The magnet Z being energized lifts its contact bars 75, 76, 77, and establishes a circuit from the positive main through conductors 70, 97, contact bar 75, armature of pilot motor P, brake magnet coil 54ª, conductor 78, magnet coils V and T, conductor 79, contact bar 76 an¹ — wire 74. The magnet T lifts its contact bar 80 to close a circuit through the main brake coil 51 as follows: from the + main through the wires 70, 107, contact bar 80, brake coil 51, contacts 42, switch arm 45, and from thence to the — wire 74. The magnet V does not lift its armature, but is used later as a holding magnet when the magnet W is operated. The operation of the magnet Z, also establishes a circuit through the reversing switch winding R', by way of conductors 70, and 97, contact bar 77, conductor 81, and contact bar 82 of magnet W, magnet winding X', conductor 83, auxiliary contacts 84, reversing switch magnet winding R', conductor 85, magnet winding Q, and to the — main. The magnet Q being energized, lifts the contact bar 88 and breaks the circuit through the magnet N, so that the latter opens the short circuit across the armature resistance. The operation of the magnet X' establishes a circuit for the magnet O as follows: from the + main through wires 70, 108, 109, contact bar 89, wire 110, magnet O and thence to the — main. The magnet O being energized, its upper contacts short circuit the section 68 of the armature resistances, leaving only the sections 67, 67', to act as a starting resistance. The armature circuit established by the reversing magnet R', is from the + main through conductor 101, contact bar 64, to brush 56, through the armature to brush 55', contact bar 65, conductor 112, through the short circuit across the resistance 68, through resistances 67', 67, conductor 113, contact bar 66 and thence to the — main.

As a result of the circuits above traced the brake magnets are energized to lift the brakes, and both the motors receive current through their armatures and field windings and will start to run at substantially the same time. The speed to which the pilot motor accelerates will depend on the distance the switch S is moved to the right. As the switch is moved away from the central position, the resistance 73 is gradually introduced into the circuit of the field winding 52, thereby weakening the field and accelerating the pilot motor. The main motor starts in a direction to lift the car, with the starting resistances 67, 67', in the armature circuit, and a strong magnetic field.

The speed of the main motor being relatively slower than that of the pilot motor, the differential gearing (Fig. 2) will operate as already described to move the arm 9 of the controller K in a counter-clockwise direction. This gradually introduces the field resistance 90 in circuit with the main field winding 53 and causes the motor M to accelerate. The difference in speed of the main and pilot motors will cause the differential gear to rotate the arm 9, until the speed of the main motor has been so changed as to correspond with that of the pilot motor, and at this time the two gear wheels 27 and 28, (Fig. 2) will rotate in synchronism. When the arm 9 has rotated far enough for the contact $b$ to engage the contact segment 91, a circuit is established through the magnets L and U' as follows: from the + main, through conductor 101, magnet L, contact ring 92, contact $b$, contact segment 91, wire 114, magnet U', and to the — main. The magnet L being energized lifts its contact bar 93 in the circuit common to the magnets N, O, J, which circuit was opened by the operation of the magnet Q. This has no immediate effect, the magnets N and J remaining dead for the present, but the magnet O is energized independently of its circuit through the controller K. The magnet U', by raising its contact bars, will establish circuit connections from the positive main to the conductor 83, to brake magnet winding 51, to magnet winding W, and to conductor 94. The magnet winding W when energized, lifts its cores within the magnetic field of the magnet V, which being energized retains the core in the lifted position. That is, the switch of the magnet W is held open independently of the magnet U'; which, if the controller arm 9 were moved off the contact 91, would immediately drop its core and open the circuit to the magnet W. Raising the contact bar 82 breaks the circuit through the magnet winding X' and allows the contact bar 89 to drop. This opens the circuit of the magnet O, and inserts the resistance 68 in the armature circuit. If the controller arm 9 continues to rotate to the right, the contact $c$ engages the contact segments 115 and 116, thus energizing the magnets O and N and thereby cutting out the starting resistance.

The operation of the magnet W, as above noted, opens the original circuit through the reversing switch R' established through the switch of magnet Z. This keeps the reversing switch coil R' from the control of the magnet Z until the car switch hand lever 50 is returned to stop position. This places the reversing switch R' and brake 51 under control of the contact arm 9 and out of the control of the car switch, so that the contact arm will always be moved back toward central position to slow down the motor before the supply circuit is opened, thereby preventing a sudden cutting off of the current and application of the brake when the pilot switch S is quickly or momentarily returned to stop position.

Energization of the magnet L, is preferably affected only when it is desired to drive the main motor M with its maximum load. At this time the magnet N will be energized to cut out all the resistance in series with the main motor armature. Should the main motor be unable to raise the load to a speed in synchronism to the pilot motor, the contact arm 9 will be advanced until the brush A makes connection with the contact segments 96 and the sectional resistance contacts 95, which close a circuit around resistance 73 of the pilot motor field winding 52 to slow down the pilot motor to a speed corresponding to that of the main motor.

In stopping the main motor, the hand lever 50 is thrown back to central position. This breaks the circuits for the magnet winding Z and the contact bars 75, 76 and 77 drop. The supply of current to the pilot motor armature and the brake winding 54$^a$ is cut off, but if the speed of the motors has been so great that the brush $b$ made contact with the contact strip 91 the magnet U' will be energized and a circuit will be closed by way of conductor 94, lower contact bar 77 of the magnet Z and through the magnet winding Y. This will energize the pilot motor P to cause rotation thereof in a direction opposite to that in which it has been running. The result of this is to return the contact arm to the central or stop position rapidly, and to bring the main motor quickly to rest. As the contact slides off the contact strip 91, the circuit through the magnet winding U' is broken, thereby breaking the circuits through the magnet windings R', Y and Q, causing their contact bars to return to their normal positions. This will sever the connection of the main motor armature to the supply mains, will stop the pilot motor P, and will complete a local or armature circuit, with the resistances 67, 68, 69 in series. The Q magnet bar 88 now being down the short circuiting magnets J, O, N, are energized in the order named to short circuit their respective resistances as the contacts on the controller K are reached by the contact $c$. This gradually decreases the resistance in the dynamic circuit and slows down the main motor, without manual attention thereto.

During the normal operation the controller arm 9 is never rotated beyond the contact strip 91, for the main motor will synchronize with the highest normal speed of the pilot motor before the arm 9 has been rotated beyond the said contact. If however, while the motor is loaded, the current should suddenly be cut off, as for example by the blowing of a fuse, the load would cause the main motor to reverse and thus drive the arm 9 rapidly upward toward the contacts 98, 99, 100. This would have substantially the same effect as moving said arm toward central position; for these contacts are connected with the contacts which control the short circuiting magnets J, O, N. If, however, the trouble were in some portion of the dynamic circuit, so that the said circuit remained open, the arm 9 might be carried around until the cam 47 (Figs. 2 and 3) engaged the roller 46 on the switch arm 45 and lifts the said arm. The arm 45 operates through the arm 43, link 23, and lever 18, positively to apply the brake. The operation of the arm 45 also opens the circuits of the brake winding 51 at the contacts 42. The combined operation of the two brake applying devices is therefore obtained, which effects a powerful action of the main brake.

To move the car downward the switch lever 50 is moved to the left. The subsequent action is similar to the action upon the upward movement, the magnets Y, R, X and U, being energized instead of the up magnets corresponding thereto, the other magnets being common to both up and down operations.

Further description is not deemed necessary, the operation of the various devices being sufficiently set forth in the foregoing description.

While I have thus described the preferred embodiment of my invention, I desire not to be limited to the precise construction, combination, and arrangement shown, as it is evident that those skilled in the art may make various changes without departing from the spirit and scope of the invention.

What I claim and desire to secure by Letters Patent of the United States is:—

1. The combination with a main motor and a pilot motor, of means to vary and control the speed of the pilot motor, differential gearing between the motors, reversing switches for the main motor, means for closing one of the reversing switches when the pilot motor is started, means to maintain the main motor at a speed in synchronism with the pilot motor and means to prevent the closure of the other reversing switch while the first one is closed.

2. The combination with a main motor and a pilot motor, of differential gearing between the motors, means for controlling the pilot motor, a controller for the main motor operated by the differential gearing, and means in connection with the controller for reducing the speed of the pilot motor when the load upon the main motor is too great.

3. The combination with a main motor and a pilot motor, of differential gearing between the motors, a controller operated by the gearing, means for controlling the direction in which the motors operate, and a magnet automatically closed when the main motor attains a predetermined speed and operative to maintain the main motor in normal operation until the said gearing effects a change in speed of the main motor.

4. The combination with a main motor and a pilot motor, of differential gearing between the motors, a controller for the main motor operated by the gearing, reversing switches for the pilot motor, means for controlling the main motor when one of the said reversing switches is closed, and means whereby the other reversing switch is closed when the closed switch is opened to effect a rapid operation of the gearing to stop the main motor.

5. The combination with a main motor and a pilot motor, of means for controlling the direction of rotation of the motors, an automatic controller for the main motor, a magnet switch automatically closed when the main motor attains a predetermined speed, and means for closing a circuit through the pilot motor armature in a reverse direction when it is desired to stop the main motor.

6. The combination with a main motor and a pilot motor, of electro-responsive reversing switches for the pilot motor, reversing switches for the main motor actuated by the operation of the pilot motor switches, a controller automatically operated by a change in relative speed of the motors, a magnet switch closed when the main motor attains a predetermined speed, and means for establishing a circuit through one electro-responsive reversing switch when the other electro-responsive reversing switch is open and the said magnet switch is closed.

7. The combination with a main motor and a pilot motor, of differential gearing between the motors, a controller operated by the gearing, and means whereby the pilot motor in the stopping of the main motor is reversed in direction to effect a more rapid return of the controller to stop position than by the operation of the main motor alone.

8. The combination with a main motor and a pilot motor, of magnet switches, sectional resistance controlled by said switches and in series with the main motor armature, reversing switches for the main motor and for the pilot motor, an electro-responsive device operative to energize one of said magnet switches when a pilot motor reversing switch is closed, a magnet operative to deenergize the last named device, and means whereby the sectional resistance may be short-circuited independently of the said electro-responsive device to accelerate the main motor.

9. The combination with a main motor and a pilot motor, of differential gearing between the motors, a controller operated by the gearing, sectional resistance and short-circuiting magnets therefor for the main motor, reversing switches for the main motor and the pilot motor, a double wound magnet operative to energize one of the short-circuiting magnets when a pilot motor reversing switch is closed, means for preventing the short-circuiting of more of the sectional resistance until the main motor attains a predetermined speed, and means thereafter operative to render the double wound magnet of no effect and to place the short-circuiting magnets under the control of the controller.

10. The combination with a main motor and a pilot motor, of planetary gearing between the motors, a controller governed by the gearing, sectional resistance for the main motor with short-circuiting magnets therefor, means for utilizing one section of the resistance to accelerate the main motor, means to prevent the operation of more than one short-circuiting magnet in accelerating the said motor, and means for rendering all the short-circuiting magnets and the sectional resistance effective to stop the main motor.

11. The combination with a main motor and a pilot motor, of epicyclic gearing between the motors, a controller operated by the gearing, sectional resistance for the main motor, short-circuiting magnets for the resistance, means to establish a circuit for one of said magnets and cause its operation when the main motor is started, means to prevent the operation of another of said magnets until a predetermined speed is attained by the motor, and means to render all of said magnets operative in bringing the motor to a stop.

12. The combination with a main motor and a pilot motor, of epicyclic gearing between the motors, a controller operated by the gearing, sectional resistance for the main motor, short-circuiting magnets for the resistance, means to establish a circuit for one of said magnets when the main motor is started, main motor reversing switches, and a magnet energized when either reversing switch is energized and effective thereupon to open the common circuit of the short-circuiting magnets.

13. The combination with a main motor and a pilot motor, of epicyclic gearing between the motors, a controller operated by the gearing, sectional resistance for the main motor, short-circuiting magnets for the resistance, means to operate one of said magnets when the main motor is started, main motor reversing switches, a magnet energized when either reversing switch is energized and effective thereupon to open the common circuit of the short-circuiting magnets, and a magnet energized when the motor attains a predetermined speed and operative to close the common circuit to the short-circuiting magnets.

In testimony whereof, I have signed my name to this specification in the presence of two subscribing witnesses.

CHARLES R. PRATT.

Witnesses:
T. W. BISCHOFF,
H. T. JOHNSON.